United States Patent
Huang et al.

(10) Patent No.: US 10,492,272 B2
(45) Date of Patent: Nov. 26, 2019

(54) LED SENSING LIGHT DRIVING CIRCUIT

(71) Applicant: XIAMEN ECO LIGHTING CO. LTD., Xiamen (CN)

(72) Inventors: Wenchang Huang, Xiamen (CN); Hemu Ye, Xiamen (CN); Wei Liu, Xiamen (CN); Zongjin Liu, Xiamen (CN); Jie Zhang, Xiamen (CN); Xiaobo Chen, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 30 days.

(21) Appl. No.: 15/927,021

(22) Filed: Mar. 20, 2018

(65) Prior Publication Data

US 2019/0297706 A1 Sep. 26, 2019

(51) Int. Cl.
*H05B 37/02* (2006.01)
*H05B 33/08* (2006.01)

(52) U.S. Cl.
CPC ..... *H05B 37/0218* (2013.01); *H05B 33/0842* (2013.01)

(58) Field of Classification Search
CPC .......... H05B 37/0218; H05B 33/0842
USPC ........................ 315/151
See application file for complete search history.

(56) References Cited

U.S. PATENT DOCUMENTS

| 4,672,300 A | * | 6/1987 | Harper | H05B 41/3927 323/222 |
| 2010/0308733 A1 | * | 12/2010 | Shao | H02M 1/4225 315/119 |
| 2011/0115391 A1 | * | 5/2011 | Chao | H05B 33/0815 315/224 |
| 2016/0044759 A1 | * | 2/2016 | Lai | H05B 33/0815 315/186 |
| 2016/0126852 A1 | * | 5/2016 | Freeman | H02M 3/33546 363/21.05 |
| 2018/0007753 A1 | * | 1/2018 | Kuang | H05B 33/0815 |
| 2018/0020516 A1 | * | 1/2018 | Gredler | H05B 33/0851 |

* cited by examiner

*Primary Examiner* — Don P Le
(74) *Attorney, Agent, or Firm* — Chun-Ming Shih; LanWay IPR Services

(57) ABSTRACT

A LED sensing light driving circuit includes a rectifying filter circuit, a buck power-supplying circuit, a constant current driving circuit, a sensing signal generating circuit, and a hysteresis comparator circuit. The rectifying filter circuit has a DC output terminal supplies power to the sensing signal generating circuit and the hysteresis comparator circuit via the buck power-supplying circuit. The sensing signal generating circuit reduces a voltage at a first input terminal of the hysteresis comparator circuit in response to increase or decrease of surrounding luminance.

19 Claims, 8 Drawing Sheets

LED SENSING LIGHT DRIVING CIRCUIT

FIELD OF THE INVENTION

The present application relates to a driving circuit, especially to an LED sensing light driving circuit.

BACKGROUND

In a current LED sensing light circuit solution, a Schmitt trigger established using two third-stage transistors is configured to receive a sensing signal for controlling at least one MOSFET and thereby to control an open state or a close state of an output terminal of an LED driving circuit for implementing a sensing light. However, the current LED sensing light circuit solution may introduce damages to LEDs when surrounding luminance changes rapidly, for example, when the current LED sensing light circuit solution is shadowed from and exposed to surrounding luminance in a rapidly alternative manner because of nearby passing objects. That is, peak currents will be frequently generated when sensing surrounding luminance and generating light-sensing currents correspondingly. The peak currents may cause repeated damages to the LEDs and degrade the current LED sensing light circuit solution's precision in triggering.

SUMMARY OF THE INVENTION

This document discloses an LED sensing light driving circuit. The LED sensing light driving circuit comprises a rectifying filter circuit, a sensing signal generating circuit, a buck power-supplying circuit, a constant current driving circuit, and a hysteresis comparator circuit. The rectifying filter circuit has a DC output terminal for supplying power to the sensing signal generating circuit and the hysteresis comparator circuit via the buck power-supplying circuit. The sensing signal generating circuit is configured to reduce a voltage at a first input terminal of the hysteresis comparator circuit in response to an increase or a decrease of surrounding luminance. The hysteresis comparator circuit has the first input terminal, a second input terminal and an output terminal. The hysteresis comparator circuit is configured to reverse a signal at the output terminal when a voltage at the first input terminal exceeds a first threshold voltage of the second input terminal or falls below a second threshold voltage of the second input terminal. Values of the first threshold voltage and the second threshold voltage are different. The output terminal of the hysteresis comparator circuit is coupled to a pulse-width modulation (PWM) input signal terminal of the constant current driving circuit.

In one example, the hysteresis comparator circuit further comprises a first resistor and a second resistor. The second input terminal of the hysteresis comparator circuit is coupled to a reference voltage source via the first resistor. The second input terminal of the hysteresis comparator circuit is also coupled to the output terminal of the hysteresis comparator circuit via the second resistor.

In one example, the hysteresis comparator circuit further comprises a third resistor. The third resistor has a first terminal coupled to a positive voltage terminal of hysteresis comparator circuit and a power source. The third resistor also has a second terminal coupled to the output terminal of the hysteresis comparator circuit.

In one example, the hysteresis comparator circuit further comprises a fourth resistor. The fourth resistor has a first terminal coupled to the output terminal of the hysteresis comparator circuit. The fourth resistor also has a second terminal coupled to the PWM input signal terminal of the constant current driving circuit.

In one example, the sensing signal generating circuit comprises a photo transistor. The photo transistor has a positive terminal coupled to a power source. The photo transistor also has a negative terminal coupled to ground via a fifth resistor. The first input terminal of the hysteresis comparator circuit is coupled to the negative terminal of the photo transistor and a common terminal of the fifth resistor.

In one example, the buck power-supplying circuit comprises a sixth resistor and a seventh resistor connected in series. Common terminals of the sixth and seventh resistors are coupled to the positive terminal of the photo transistor. Another terminal of the sixth resistor is coupled to a DC output terminal of the rectifying filter circuit. Another terminal of the seventh resistor is coupled to ground.

In one example, the buck power-supplying circuit further comprises a regulator transistor coupled in parallel to the seventh resistor.

In one example, the regulator transistor comprises a Zener diode.

In one example, the buck power-supplying circuit further comprises a first capacitor coupled to the seventh resistor in parallel.

In one example, values of the first threshold voltage and the second threshold voltage change in response to resistance changes of the first resistor and the second resistor.

In one example, the constant current driving circuit is a buck circuit that comprises a driving integrated circuit (IC). The PWM signal input terminal of the constant current driving circuit is a PWM pin of the driving IC.

In one example, the rectifying filter circuit comprises a full bridge rectifier. The full bridge rectifier has two input terminals coupled to an AC power source respectively. The full bridge rectifier also has a first DC output terminal and a second DC output terminal. The first DC output terminal is coupled to ground. The second DC output terminal is coupled to a filter circuit.

In one example, the rectifying filter circuit comprises an inductor-capacitor (LC) filter circuit.

In one example, the LC filter circuit comprises a first inductor and a second capacitor. The first inductor has a first terminal coupled to the second DC output terminal of the full-bridge rectifier. The first inductor also has a second terminal coupled to the DC output terminal of the rectifying filter circuit. The second capacitor has a first terminal coupled to the second terminal of the first inductor and a second terminal coupled to ground.

In one example, the constant current driving circuit further comprises an eighth resistor. The eighth resistor has a first terminal coupled to a control terminal of the driving IC. The eighth resistor also has a second terminal coupled to ground and a ground terminal of the driving IC.

In one example, the constant current driving circuit further comprises a diode, a second inductor, a third capacitor, a ninth resistor and a plurality of LEDs connected in series. The diode has a first terminal coupled to the DC output terminal of the rectifying filter circuit and a second terminal coupled to a drain terminal of the driving IC. The second inductor has a first terminal coupled to the drain terminal of the driving IC. The third capacitor has a first terminal coupled to the first terminal of the diode and a second terminal coupled to a second terminal of the second inductor. The ninth resistor is coupled to the third capacitor in parallel. The plurality of LEDs is coupled to the third capacitor in parallel.

In one example, the LED sensing light driving circuit comprises a rectifying filter circuit, a sensing signal generating circuit, a buck power-supplying circuit, a constant current driving circuit; and a hysteresis comparator circuit. The rectifying filter circuit is configured to supply power to the sensing signal generating circuit and the hysteresis comparator circuit via the buck power-supplying circuit. The sensing signal generating circuit is configured to reduce an input voltage of the hysteresis comparator circuit in response to an increase or a decrease of surrounding luminance. The hysteresis comparator circuit is configured to reverse its output voltage when a voltage level of the input voltage exceeds a first threshold voltage of the hysteresis comparator circuit or falls below a second threshold voltage of the hysteresis comparator circuit. Values of the first threshold voltage and the second threshold voltage are different. The output voltage of the hysteresis comparator circuit is used for controlling a pulse-width modulation (PWM) input signal of the constant current driving circuit.

In one example, the LED sensing light driving circuit comprises a photo transistor and an LED light source board. The photo transistor is disposed at a center of the LED light source board. The photo transistor is configured to render a sum of included angles of lights emitted from any two LEDs on the LED light source board in the proximity of the photo transistor to be not larger than a threshold angle that renders the photo transistor to absorb a local maximal surrounding luminance.

DETAILED DESCRIPTION OF THE INVENTION

Supplemental descriptions of the present invention are provided using combinations of illustrations and the following embodiments.

Figure 1:
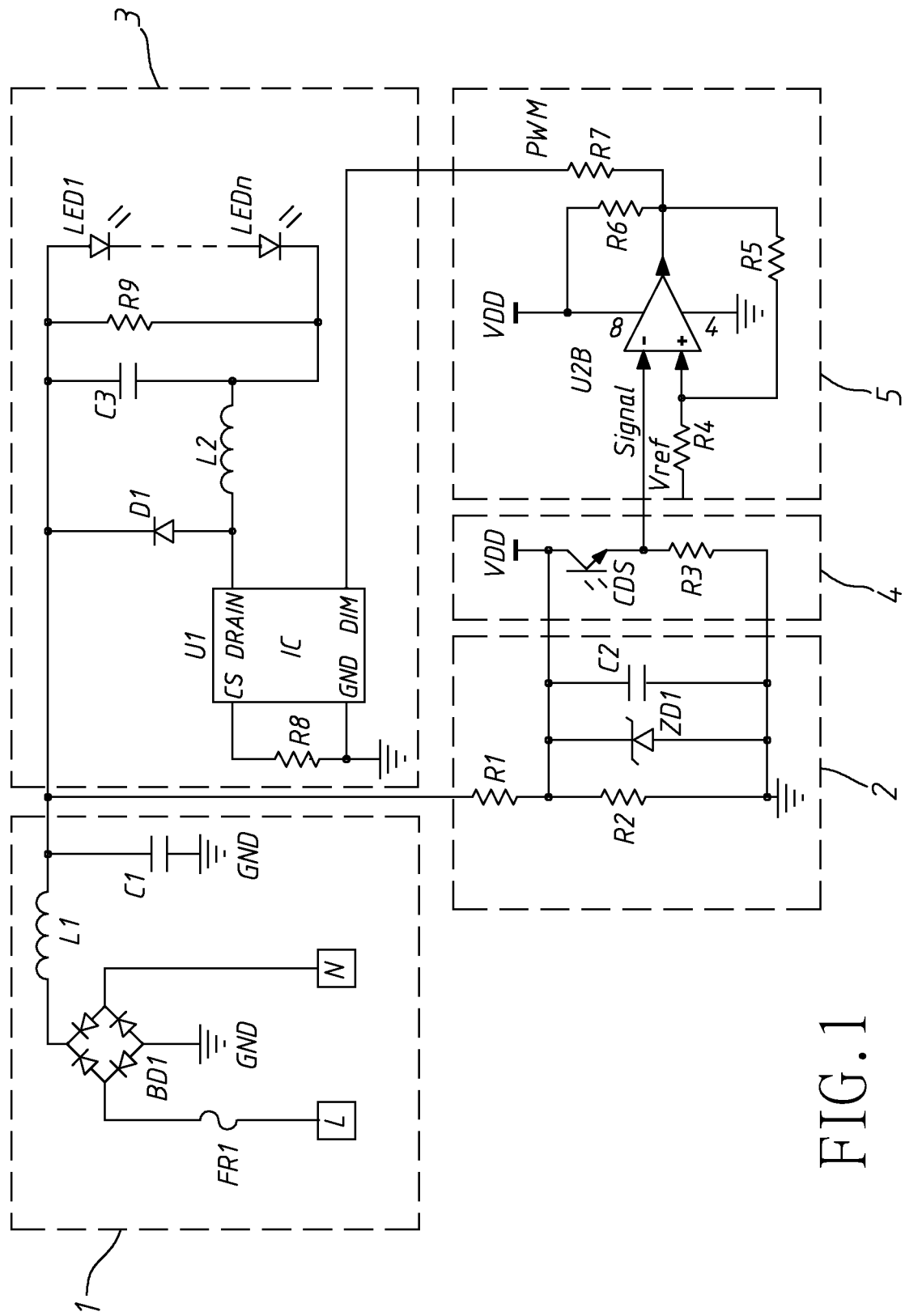
FIG. 1 is a circuit diagram according to one example of the present invention.

Please refer to FIG. 1 that illustrates an LED sensing light driving circuit 10, which includes a rectifying filter circuit 1, a buck power-supplying circuit 2, a constant current driving circuit 3, a sensing signal generating circuit 4 and a hysteresis comparator circuit 5.

In one example, the rectifying filter circuit 1 includes a first inductor L1, a first capacitor C1, a current source FR1, and a full-bridge rectifier BD1.

In one example, a first DC output terminal of the full-bridge rectifier BD1 is coupled to a first terminal of the first inductor L1. The first capacitor C1 has a first terminal coupled to a second terminal of the first inductor L1 and a second terminal coupled to ground. A combination of the first inductor L1 and the first capacitor C1 may be regarded as an inductor-capacitor filter circuit (i.e. a LC filter circuit). The full-bridge rectifier BD1 also has a second DC output terminal coupled to ground, a first AC terminal coupled to a first AC power source L, and a second AC terminal coupled to a second AC power source N.

In one example, the buck power-supplying circuit 2 includes a first resistor R1, a second resistor R2, a second capacitor C2, and a regulator transistor ZD1.

In one example, the first resistor R1 has a first terminal coupled to an DC output terminal of the rectifying filter circuit 1 that is coupled to the second terminal of the first inductor L1. The second resistor R2 has a first terminal coupled to a second terminal of the first resistor R1 and a second terminal coupled to ground. The second resistor R2 is also coupled to the regulator transistor ZD1 and the second capacitor C2 in parallel.

In one example, the constant current driving circuit 3 includes a first diode D1, a second inductor L2, a third capacitor C3, an eighth resistor R8, a ninth resistor R9, a plurality of LED diodes LED1, . . . , LEDn that are connected in series, and an integrated circuit (IC) U1. The constant current driving circuit 3 may be a buck circuit.

In one example, the eighth resistor R8 has a first terminal coupled to a CS(control) pin of the IC U1 and a second terminal coupled to ground and a ground pin of the IC U1. The first diode D1 has a first terminal coupled to the DC output terminal of the rectifying filter circuit 1 and a second terminal coupled to a drain pin of the IC U1 and a first terminal of the second inductor L2. The third capacitor C3 has a first terminal coupled to the first terminal of the first diode D1 and a second terminal of the second inductor L2. The third capacitor C3 is also coupled to the ninth resistor R9 and the plurality of LEDs LED1, . . . , LEDn in parallel.

In one example, the sensing signal generating circuit 4 includes a photo transistor CDS and a third resistor R3.

In one example, the photo transistor CDS that has a positive terminal coupled to a DC power source VDD and has a negative terminal coupled to ground via the resistor R3 that has a second terminal coupled to ground. The photo transistor CDS is configured to generate a voltage at its negative terminal in response to surrounding luminance.

In one example, the hysteresis comparator circuit 5 includes a fourth resistor R4, a fifth resistor R5, a sixth resistor R6, a seventh resistor R7, and a comparator U2B.

In one example, a first input terminal of the comparator U2B is coupled to the negative terminal of the photo transistor CDS for receiving the voltage generated in response to the surrounding luminance and a first terminal (i.e. a common terminal) of the third resistor R3. The comparator U2B also has a second input terminal coupled to a reference voltage source Vref via the fourth resistor R4 and an output terminal of the comparator U2B via the fifth resistor R5, a positive voltage terminal coupled to the DC power source VDD and the output terminal of the comparator U2B via the sixth resistor R6, a negative voltage terminal coupled to ground, and the output terminal coupled to a pulse width modulation (PWM) signal input pin (label as "DIM" on FIG. 1) of the IC U1 via the seventh resistor R7.

The rectifying filter circuit 1 supplies power to the sensing signal generating circuit 4 and the hysteresis comparator circuit 5 via its DC output terminal and the buck power-supplying circuit 2. The sensing signal generating circuit 4 reduces a voltage level at a first input terminal of the hysteresis comparator circuit 5 (e.g. the first input terminal of the comparator U2B) in response to an increase or a decrease of surrounding luminance. The comparator U2B reverses a voltage level at its output terminal when a voltage at its first input terminal exceeds a first threshold voltage VH1 of its second input terminal or falls below a second threshold voltage VH2 of its second input terminal. It is also noted that a reverse at the output terminal of the comparator U2B or the hysteresis comparator circuit 5 introduces an on/off status change of the IC U1 via the PWN pin of the IC U1, and an on/off status of the plurality of LEDs LED 1, . . . , LEDn is changed in correspondence of the on/off status of the IC U1. That is, the plurality of LEDs LED 1, . . . , LEDn are switched on when the IC U1 is activated via a switch-on signal at its PWM pin, that may refer to a high voltage level in a first example or a low voltage level in a second example at the output terminal of the comparator U2B; else, the plurality of LEDs LED 1, . . . , LEDn are switched off when the IC U1 is inactivated via a switch-off signal at its PWM pin, that may refer to a high voltage level in the second example or a low voltage level in the first example at the output terminal of the comparator U2B. Damages to LED lights, which are caused by an erroneous trigger resulted from frequent reverses of the hysteresis comparator circuit 5 or the comparator U2B every time when a peak current occurs, may thus be better prevented because of a difference between the first threshold voltage VH1 and the second threshold voltage VH2.)

In one example, values of the first and second threshold voltages VH1 and VH2 are adjustable.

As illustrated in the hysteresis comparator circuit 5 of FIG. 1, the first threshold voltage VH1 may be calculated as:

$$VH1 = \frac{R5 * Vref}{R4 + R5} + \frac{R4 * Vout}{R4 + R5} = \frac{R4 + R5 * Vref + Vout}{R4 + R5}; \quad (1)$$

In Equation (1), Vout indicates an output voltage level of the hysteresis comparator circuit 5, e.g. at the output terminal of the comparator U2B.

Assume that Vref is equal to half of VDD. Since the hysteresis comparator circuit 5 outputs a high voltage level at its output terminal before occurrence of an increase of the voltage at its first input terminal, an output voltage Vout may be equal to the voltage level of the DC power source VDD, for example, 5 volts, i.e., Vout=VDD=5V. Equation (1) can thus be simplified as:

$$VH1 = \frac{R4 + R5 + \frac{1}{2}VDD + VDD}{R4 + R5} = \frac{R5 + 2R4}{2(R4 + R5)} * VDD; \quad (2)$$

The second threshold voltage VH2 may also be calculated as:

$$VH2 = \frac{R5 * Uref}{R4 + R5} + \frac{R4 * Uout}{R4 + R5} = \frac{R5 * Uref + R4 * Uout}{R4 + R5}; \quad (3)$$

Similarly, assume that $$Vref = \frac{1}{2}VDD.$$

since the hysteresis comparator circuit 5 outputs a low voltage level at its output terminal before occurrence of a decrease of the voltage level at its first input terminal, an output voltage Vout equals 0V (i.e., Vout=0V) so that the LED lights (i.e., the plurality of LED diodes LED1, . . . , LEDn) shut down, and Equation (3) can be simplified as:

$$VH2 = \frac{R5 + \frac{1}{2}VDD + R4 * VDD}{R4 + R5} = \frac{R5}{2(R4 + R5)} * VDD; \quad (4)$$

As can be observed from Equations (1)-(4), a difference between the first and second threshold voltages VH1 and VH2 can be designed by adjusting resistances of the resistors R4 and R5.

Figure 2:
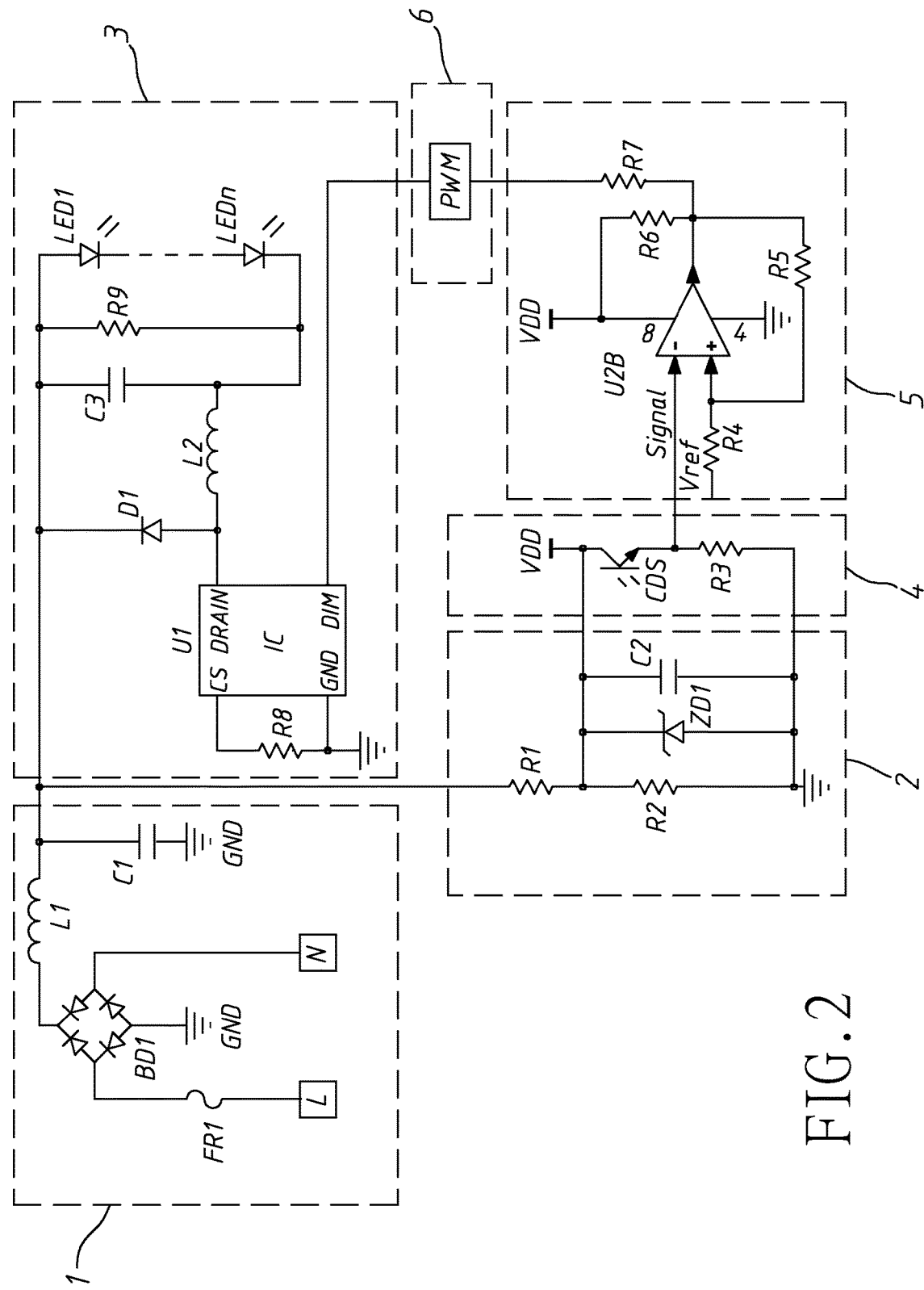
FIG. 2 is another example that utilizes a Pulse-width modulation (PWM) module based on the circuit diagram of FIG. 1.

In one example, the LED sensing light driving circuit 10 may further include a PWM controlling module 6 that is coupled in between the hysteresis comparator circuit 5 and the constant current driving circuit 3, or more particularly, in between the output terminal of the comparator U2B and the PWM pin of the IC U2B, as shown in FIG. 2. The PWM controlling module 6 is configured to control a duty cycle of the output signal of the hysteresis comparator circuit 5 in response to an external command or dynamically. Therefore, with the aid of the PWM controlling module 6, a length of an activated time interval or an inactivated time interval of the IC U1 can be controlled to better prevent the plurality of LEDs LED1, . . . , LEDn from the abovementioned damage, for example, rendering the transition of the on/off status of the IC U1 or the plurality of LEDs LED1, . . . , LEDn in a smoother manner. For example, the PWM controlling module 6 can gradually increase the duty cycle of the output signal of the hysteresis comparator circuit 5 to softly turn on the plurality of LEDs LED1, . . . , LEDn. Similarly, the PWM controlling module 6 can gradually decrease the duty cycle of the output signal of the hysteresis comparator circuit 5 to softly turn off the plurality of LEDs LED1, . . . , LEDn. In this way, users would not experience a sudden turning-on or turning-off of the LEDs. Benefits of applying the PWM controlling module 6 may also include higher precision of controlling the plurality of LEDs LED1, . . . , LEDn's luminance or luminance ratio.

In one example, the photo transistor CDS may acquire a delay-triggering function that delays its response to a change of surrounding luminance. With the aid of the delay-triggering function, the driving IC U1 can have a slower response in switching its on/off status and thus have a better protection against rapid change of surrounding luminance.

The present invention also aims at solving a luminance collecting problem of the abovementioned current LED sensing light circuit solution. The current LED sensing light circuit solution collects light by disposing a light sensing element, for example, a photo transistor, at a lateral side of each light bulb. However, each time when the light bulb is turned, it's difficult to make sure that the light sensing element faces directly at or away from surrounding light sources, and the precision of collecting surrounding luminance will be significantly degraded if the light sensing element faces away from the surrounding light sources.

For overcoming the abovementioned defect, in one example, the light sensing element is disposed in the center of an LED light source board. Therefore, surrounding luminance can be precisely collected through light bulbs disposed on the LED light source board.

Figure 3:
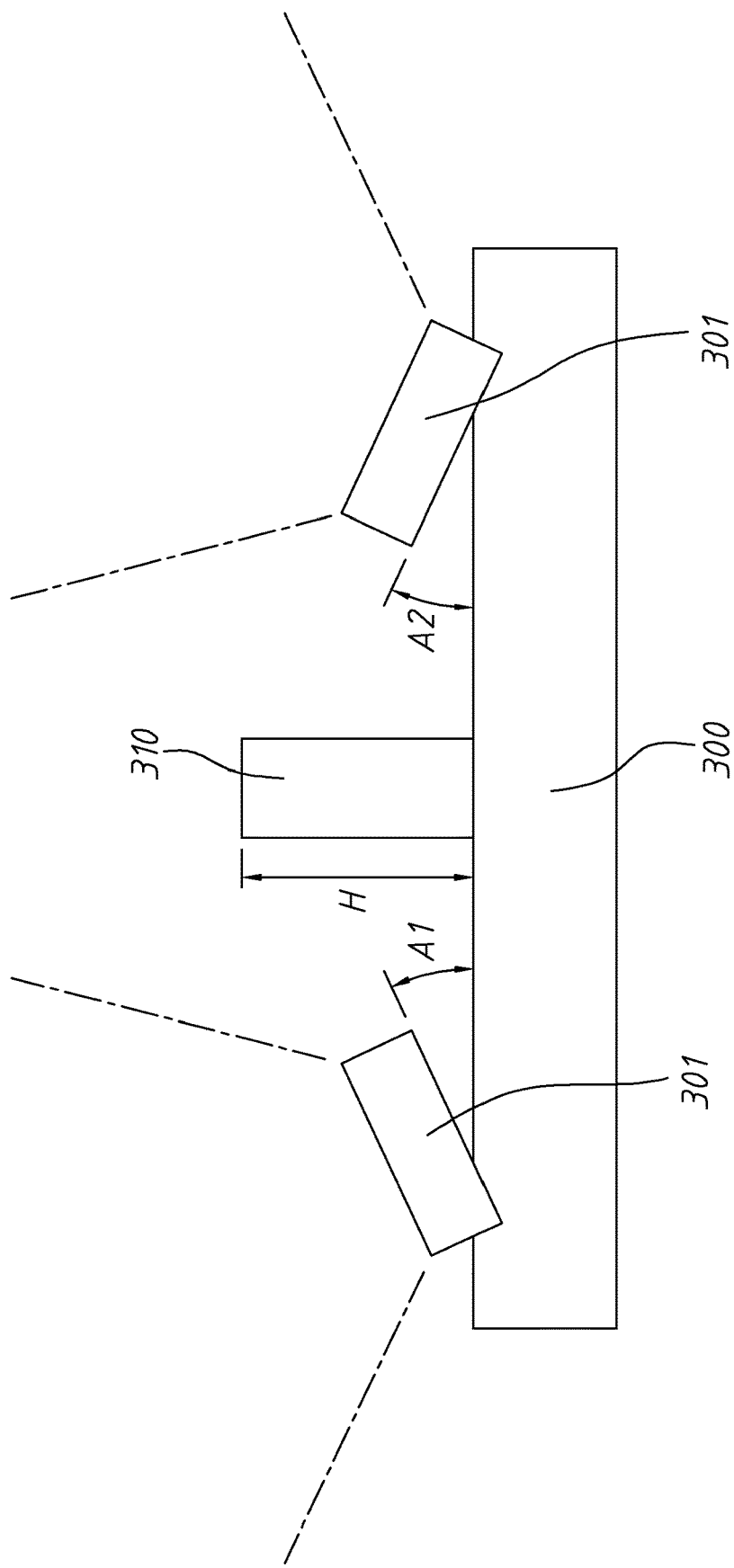
FIG. 3 illustrates an example of disposing a photo transistor at the center of an LED light source board that may be disposed inside the plurality of LEDs shown in FIG. 1 and FIG. 2.

Please refer to FIG. 3, which illustrates an example of disposing a photo transistor 310 at the center of the LED light source board 300 that may be disposed inside the plurality of LEDs LED1, . . . , LEDn shown in FIG. 1 and FIG. 2. As shown in FIG. 3, two LEDs 301 and 302 are disposed close to edges of the LED light source board 300. The photo transistor 310 is higher than both the LEDs 301 and 302 by a height H. In one example, the height H is designed in a manner that a sum of a first included angle A1 of lights emitted from the LED 301 and a second included angle A2 of lights emitted from the LED 302 is not larger than a threshold angle that renders the photo transistor 310 can absorb a local maximal surrounding luminance. In one example, the threshold angle is 120 degrees, as shown in FIG. 3.

In one example, the photo transistor 310 may be of surface-attaching type or of upright type.

Figure 4:
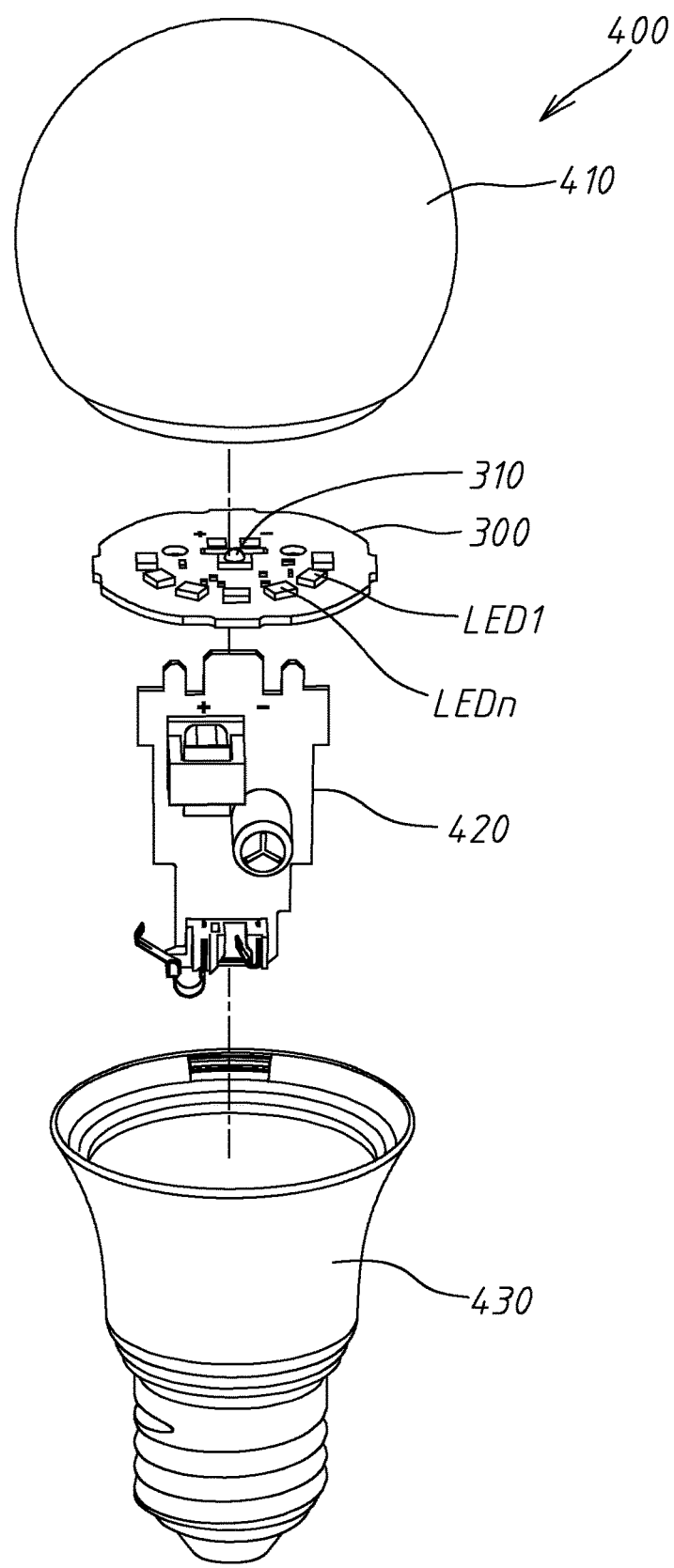
FIG. 4 illustrates an exemplary perspective view of the light source board shown in FIG. 3.

Please also refer to FIG. 4, which illustrates a perspective view of an LED light module 400 that encompasses the light source board 300 shown in FIG. 3, where the photo transistor 310 may be disposed at a center of the light source board 300. Note that the LED light module 400 further includes a bulb 410, a power supplying circuit 420, and a base 430. With the aid of such disposition, including the location and the height of the photo transistor 310, the photo transistor 310 faces less obstacles of receiving surrounding luminance. As a result, the precision of collecting surrounding luminance by the photo transistor 310 is significantly increased.

Figure 5:
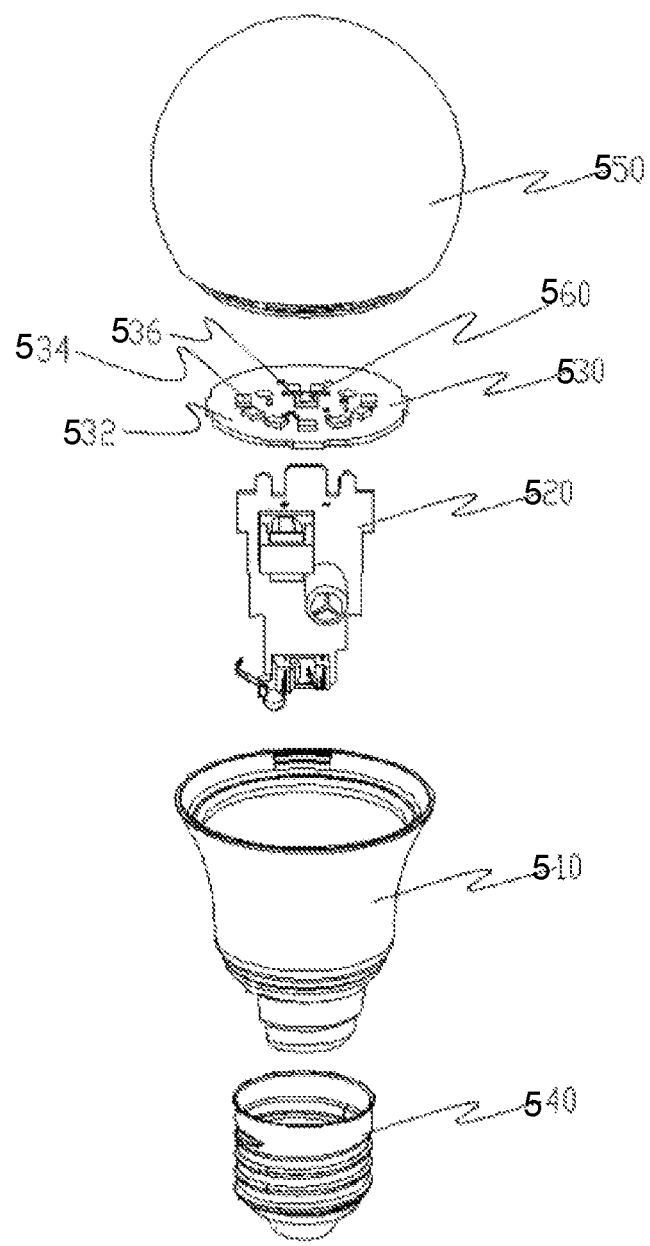
FIG. 5 is an exploded component diagram that illustrates a light apparatus embodiment.
Figure 6:
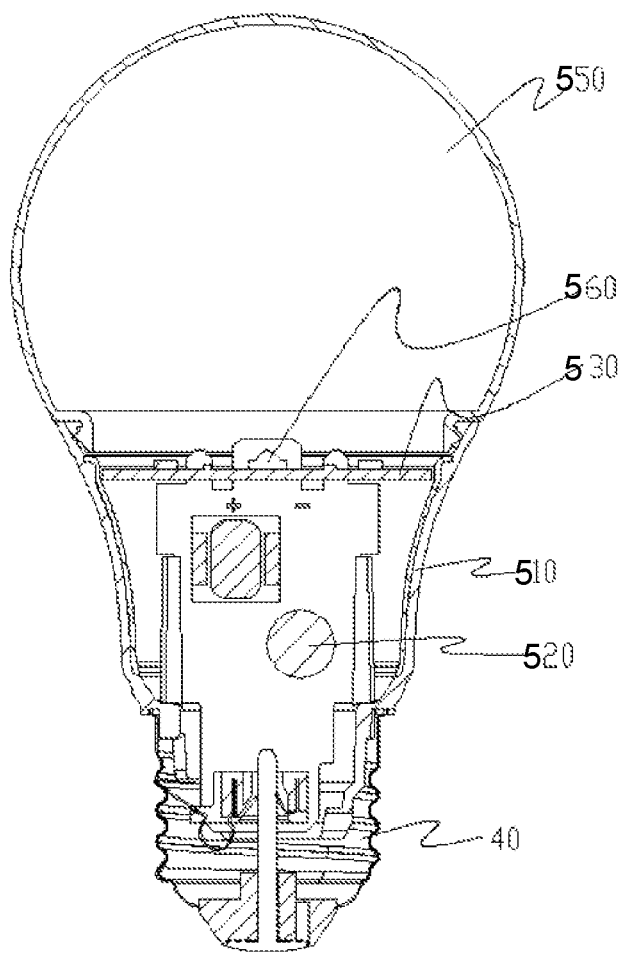
FIG. 6 is a cross-sectional view of the embodiment of FIG. 5.

Please refer to FIG. 5 and FIG. 6, which illustrates a light apparatus embodiment.

In FIG. 5 and FIG. 6, the light apparatus, e.g. a light bulb, includes a housing 510, a driver circuit board 520 and a light source plate 530, a light cap 540 attached to bottom of the shell 550, a light detector 560 for sending light strength to generate a control signal.

The light detector 560 is disposed inside the light apparatus and placed at the center of the top side of the light source board 530.

In some embodiments, when the light detector 560 detects an environment light strength smaller than a threshold, e.g. 10 Lx+5 Lx or 10 Lx−5 Lx, the light source plate 530 is turned on and emits light.

When the light detector 560 detects an environment light strength larger than a predetermined threshold, e.g. 30 Lx+10 Lx or 30 Lx−10 Lx, and the infrared wave length is between 800 nm to 1100 nm, the light source plate is turned off, switching off LED modules thereon.

The light source plate 50 includes an aluminum plate 532 and LED modules 534 disposed on the aluminum plate 532. The light detector 560 is taller than the top surface of the light source board 532 to increase detection range, e.g. 360 degrees detection.

The light detector 560 is fixed at middle place of the aluminum plate 530.

There is a fixing base 536 on the aluminum plate 532. The light detector 560 is fixed on the fixing base 536.

In some embodiments, the light detector 560 is an optical tube sensor attached as a surface mounting component on the light source plate 530.

Figure 7:
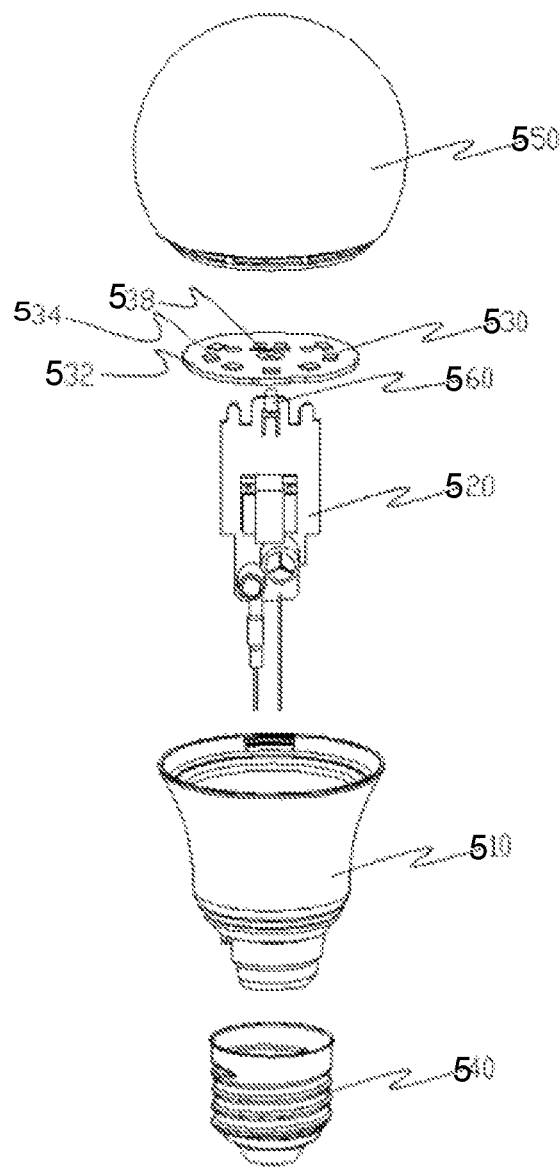
FIG. 7 is an exploded component diagram that illustrates another light apparatus embodiment.
Figure 8:
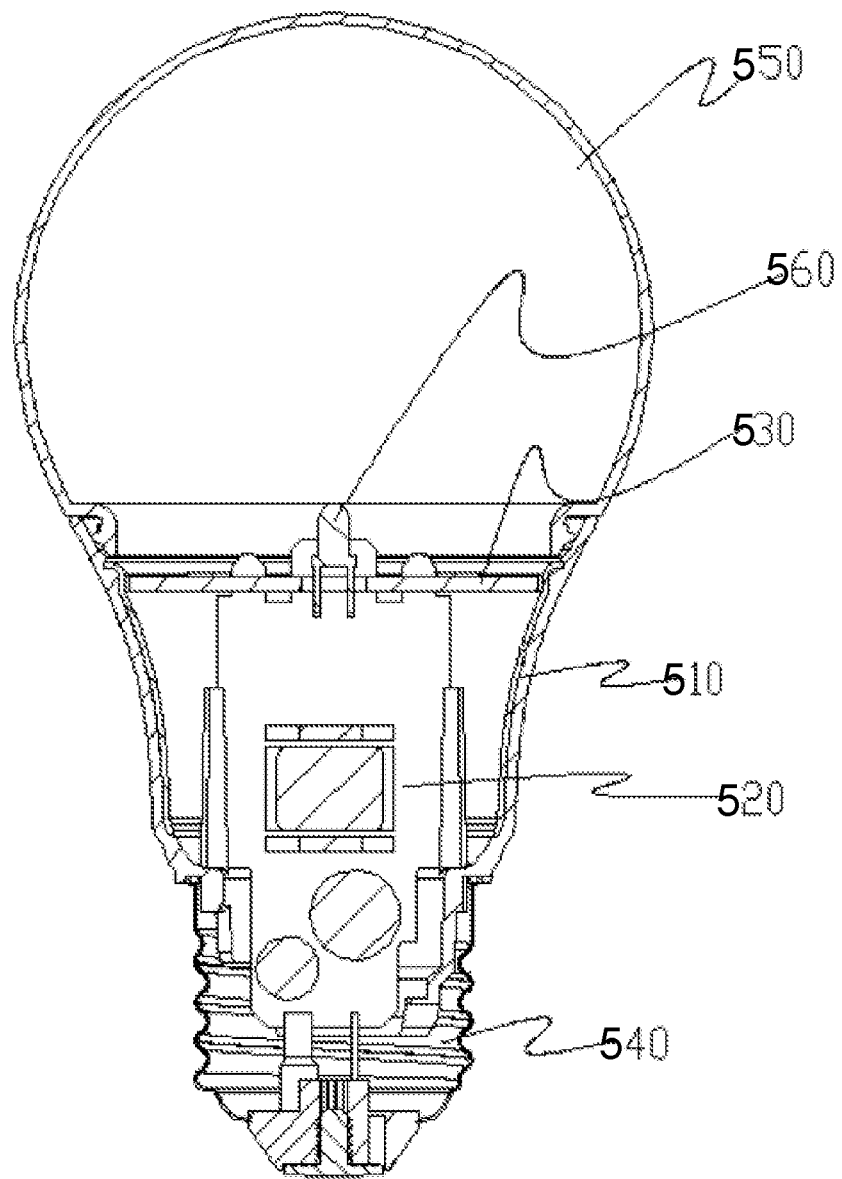
FIG. 8 is a cross-sectional view of the embodiment of FIG. 7.

Please refer to FIG. 7 and FIG. 8, which illustrates a similar embodiment as FIG. 5 and FIG. 6.

The difference in this embodiment is that the light detector 560 is fixed on the top of the driver circuit board 520. There is a through hole in the aluminum plate 532. When the driver circuit board 520 is installed and fixed with one end to the aluminum plate 532, the light detector 560 passes through the through hole and stands above the surface of the aluminum plate 532. Other components with the same reference numerals refer to the same or similar components as explained above for FIG. 5 and FIG. 6 and not repeated here again.

One skill in the art understands that the search method associated with the application is similar to the search method in the context of the apps, which was described in detail previously. Therefore, all the embodiments, methods, systems and components relating to apps apply to applications.

The invention claimed is:

1. An LED sensing light driving circuit, comprising:
   a rectifying filter circuit having a DC output terminal;
   a sensing signal generating circuit;
   a buck power-supplying circuit;
   a constant current driving circuit; and
   a hysteresis comparator circuit having a first input terminal, a second input terminal and an output terminal;
   wherein the rectifying filter circuit is configured to supply power to the sensing signal generating circuit and the hysteresis comparator circuit via the DC output terminal and the buck power-supplying circuit;
   wherein the sensing signal generating circuit is configured to reduce a voltage at the first input terminal of the hysteresis comparator circuit in response to an increase or a decrease of surrounding luminance;
   wherein the hysteresis comparator circuit is configured to reverse a signal at the output terminal when a voltage at the first input terminal exceeds a first threshold voltage of the second input terminal or falls below a second threshold voltage of the second input terminal;
   wherein values of the first threshold voltage and the second threshold voltage are different; and
   wherein the output terminal of the hysteresis comparator circuit is coupled to a pulse-width modulation (PWM) input signal terminal of the constant current driving circuit.

2. The LED sensing light driving circuit of claim 1, wherein the hysteresis comparator circuit further comprises a first resistor and a second resistor;
   wherein the second input terminal of the hysteresis comparator circuit is coupled to a reference voltage source via the first resistor and coupled to the output terminal of the hysteresis comparator circuit via the second resistor.

3. The LED sensing light driving circuit of claim 2, wherein the hysteresis comparator circuit further comprises a third resistor; and
   wherein the third resistor has a first terminal coupled to a positive voltage terminal of hysteresis comparator circuit and a power source and has a second terminal coupled to the output terminal of the hysteresis comparator circuit.

4. The LED sensing light driving circuit of claim 2, wherein the hysteresis comparator circuit further comprises a fourth resistor; and
   wherein the fourth resistor has a first terminal coupled to the output terminal of the hysteresis comparator circuit and has a second terminal coupled to the PWM input signal terminal of the constant current driving circuit.

5. The LED sensing light driving circuit of claim 2, wherein the sensing signal generating circuit comprises a photo transistor having a positive terminal coupled to a power source and having a negative terminal coupled to ground via a fifth resistor; and wherein the first input terminal of the hysteresis comparator circuit is coupled to the negative terminal of the photo transistor and a common terminal of the fifth resistor.

6. The LED sensing light driving circuit of claim 5, wherein the buck power-supplying circuit comprises a sixth resistor and a seventh resistor connected in series, common terminals of the sixth and seventh resistors are coupled to the positive terminal of the photo transistor, another terminal of the sixth resistor is coupled to a DC output terminal of the rectifying filter circuit, and another terminal of the seventh resistor is coupled to ground.

7. The LED sensing light driving circuit of claim 6, wherein the buck power-supplying circuit further comprises a regulator transistor coupled in parallel to the seventh resistor.

8. The LED sensing light driving circuit of claim 6, wherein the buck power-supplying circuit further comprises a first capacitor coupled to the seventh resistor in parallel.

9. The LED sensing light driving circuit of claim 2, wherein values of the first threshold voltage and the second threshold voltage change in response to resistance changes of the first resistor and the second resistor.

10. The LED sensing light driving circuit of claim 1, wherein the constant current driving circuit is a buck circuit that comprises a driving integrated circuit (IC), and the PWM signal input terminal of the constant current driving circuit is a PWM pin of the driving IC.

11. The LED sensing light driving circuit of claim 10, wherein the rectifying filter circuit comprises a full bridge rectifier that has two input terminals coupled to an AC power source respectively and has a first DC output terminal and a second DC output terminal, the first DC output terminal is coupled to ground, and the second DC output terminal is coupled to a filter circuit.

12. The LED sensing light driving circuit of claim 11, wherein the rectifying filter circuit further comprises a first inductor and a second capacitor; wherein the first inductor has a first terminal coupled to the second DC output terminal of the full-bridge rectifier and a second terminal coupled to the DC output terminal of the rectifying filter circuit; and
wherein the second capacitor has a first terminal coupled to the second terminal of the first inductor and a second terminal coupled to ground.

13. The LED sensing light driving circuit of claim 10, wherein the constant current driving circuit further comprises an eighth resistor; and
wherein the eighth resistor has a first terminal coupled to a control terminal of the driving IC and a second terminal coupled to ground and a ground terminal of the driving IC.

14. The LED sensing light driving circuit of claim 10, wherein the constant current driving circuit further comprises a diode, a second inductor, a third capacitor, a ninth resistor and a plurality of LEDs connected in series;
wherein the diode has a first terminal coupled to the DC output terminal of the rectifying filter circuit and a second terminal coupled to a drain terminal of the driving IC;
wherein the second inductor has a first terminal coupled to the drain terminal of the driving IC;
wherein the third capacitor has a first terminal coupled to the first terminal of the diode and a second terminal coupled to a second terminal of the second inductor;
wherein the ninth resistor is coupled to the third capacitor in parallel; and
wherein the plurality of LEDs is coupled to the third capacitor in parallel.

15. The LED sensing light driving circuit of claim 5, wherein the photo transistor is disposed at a center of an LED light source board.

16. The LED sensing light driving circuit of claim 15, wherein a height of the photo transistor on the LED light source board renders a sum of included angles of lights emitted from any two LEDs in the proximity of the photo transistor to be not larger than a threshold angle that renders the photo transistor to absorb a local maximal surrounding luminance.

17. The LED sensing light driving circuit of claim 16, wherein the threshold angle is 120 degrees.

18. The LED sensing light driving circuit of claim 15, wherein the photo transistor is further configured to delay a response to a change of the surrounding luminance.

19. An LED sensing light driving circuit, comprising:
a rectifying filter circuit;
a sensing signal generating circuit;
a buck power-supplying circuit;
a constant current driving circuit; and
a hysteresis comparator circuit;
wherein the rectifying filter circuit is configured to supply power to the sensing signal generating circuit and the hysteresis comparator circuit via the buck power-supplying circuit;
wherein the sensing signal generating circuit is configured to reduce an input voltage of the hysteresis comparator circuit in response to an increase or a decrease of surrounding luminance;
wherein the hysteresis comparator circuit is configured to reverse its output voltage when a voltage level of the input voltage exceeds a first threshold voltage of the hysteresis comparator circuit or falls below a second threshold voltage of the hysteresis comparator circuit;
wherein values of the first threshold voltage and the second threshold voltage are different; and
wherein the output voltage of the hysteresis comparator circuit is used for controlling a pulse-width modulation (PWM) input signal of the constant current driving circuit.

* * * * *